US012405560B2

(12) United States Patent
Masaki et al.

(10) Patent No.: US 12,405,560 B2
(45) Date of Patent: Sep. 2, 2025

(54) CHARGE-ELIMINATING APPARATUS AND IMAGE FORMING SYSTEM

(71) Applicant: CANON KABUSHIKI KAISHA, Tokyo (JP)

(72) Inventors: Takuya Masaki, Chiba (JP); Toshifumi Oikawa, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/423,716

(22) Filed: Jan. 26, 2024

(65) Prior Publication Data

US 2024/0255882 A1 Aug. 1, 2024

(30) Foreign Application Priority Data

Jan. 30, 2023 (JP) ................................ 2023-011637

(51) Int. Cl.

*G03G 15/00* (2006.01)
*B65H 37/00* (2006.01)
*G03G 21/16* (2006.01)

(52) U.S. Cl.

CPC ......... *G03G 15/6573* (2013.01); *B65H 37/00* (2013.01); *G03G 15/5012* (2013.01); *G03G 15/55* (2013.01); *G03G 21/1619* (2013.01); *B65H 2301/5133* (2013.01); *G03G 2215/00417* (2013.01)

(58) Field of Classification Search

CPC .. G03G 15/5012; G03G 15/55; G03G 15/553; G03G 15/6573; G03G 15/6576; G03G 2215/00417; G03G 2215/00535; G03G 2215/00556; G03G 2215/00649; G03G 2215/00654; B65H 37/00; B65H 2301/5133

See application file for complete search history.

(56) References Cited

U.S. PATENT DOCUMENTS 6,668,154 B2 * 12/2003 Dickhoff ............ G03G 15/0291 399/388
2011/0279860 A1 * 11/2011 Horiuchi ............ G03G 15/5079 358/1.15
2014/0294421 A1 * 10/2014 Takahashi .......... G03G 15/5016 399/81
2021/0026270 A1 * 1/2021 Ogawara ............ G03G 15/0258
2021/0216031 A1 * 7/2021 Tanaka ............... G03G 15/6535

FOREIGN PATENT DOCUMENTS

JP 2019167169 A 10/2019

* cited by examiner

*Primary Examiner* — Carla J Therrien
(74) *Attorney, Agent, or Firm* — ROSSI, KIMMS & McDOWELL LLP

(57) ABSTRACT

A charge-eliminating apparatus eliminates charge of a sheet on which an image is formed by an image forming apparatus. The charge-eliminating apparatus comprises a conveying member configured to convey the sheet conveyed from the image forming apparatus, a non-contact charge eliminating unit configured to eliminate charge of the sheet in a non-contact state with respect to the sheet conveyed by the conveying member, a frame configured to accommodate the conveying member and the non-contact charge eliminating unit, and an indicating portion configured to indicate indication contents indicating that maintenance is required for the non-contact charge eliminating unit based on a predetermined signal output from the non-contact charge eliminating unit.

13 Claims, 11 Drawing Sheets

CHARGE-ELIMINATING APPARATUS AND IMAGE FORMING SYSTEM

BACKGROUND OF THE DISCLOSURE

Field of the Disclosure

The present disclosure relates to a charge-eliminating apparatus configured to eliminate charge of a recording medium output from an image forming apparatus, and to an image forming system.

Description of the Related Art

In an image forming apparatus such as a copying machine, printer, or facsimile machine using an electrophotographic process or an electrostatic recording method, a sheet (recording medium) becomes electrically charged during image formation, and ejected sheets stick to each other by electrostatic force generated between the ejected sheets, so that an improper stack of sheet may occur. Therefore, an image forming apparatus provided with a charge-eliminating apparatus configured to eliminate electrostatic charge of sheets has been proposed. The charge-eliminating apparatus described in Japanese Patent Application Laid-Open No. 2019-167169 has a contact charge eliminating unit configured to eliminate charge of a sheet being conveyed in contact with the sheet, and a non-contact charge eliminating unit configured to eliminate charge of a sheet being conveyed in a non-contact state. As the contact charge eliminating unit, a charge-eliminating roller pair configured to eliminate charge of a sheet by nipping the sheet is known. As the non-contact charge eliminating unit, a charge-eliminating wire or a needle-like electrode that generates an ion is known.

When the non-contact charge eliminating unit is continuously used, a foreign matter adheres to an electrode portion, and the charge-eliminating performance of the non-contact charge eliminating unit may deteriorate. Therefore, it is desirable that the non-contact charge eliminating unit is cleaned as necessary. However, in the charge-eliminating apparatus, since the non-contact charge eliminating unit is accommodated inside a housing, it is difficult for the user to determine whether maintenance of the non-contact charge eliminating unit is required.

SUMMARY OF THE DISCLOSURE

Therefore, it is an object of the present disclosure to provide a charge-eliminating apparatus in which a user can easily check whether maintenance of a non-contact charge eliminating unit is required.

According to an embodiment of the disclosure, a charge-eliminating apparatus is configured to eliminate charge of a sheet on which an image is formed by an image forming apparatus, the charge-eliminating apparatus comprising: a conveying member configured to convey the sheet conveyed from the image forming apparatus; a non-contact charge eliminating unit configured to eliminate charge of the sheet in a non-contact state with respect to the sheet conveyed by the conveying member; a frame configured to accommodate the conveying member and the non-contact charge eliminating unit; and an indicating portion configured to indicate indication contents indicating that maintenance is required for the non-contact charge eliminating unit based on a predetermined signal output from the non-contact charge eliminating unit.

Further features of the present disclosure will become apparent from the following description of exemplary embodiments with reference to the attached drawings.

DESCRIPTION OF THE EMBODIMENTS

Figure 1:
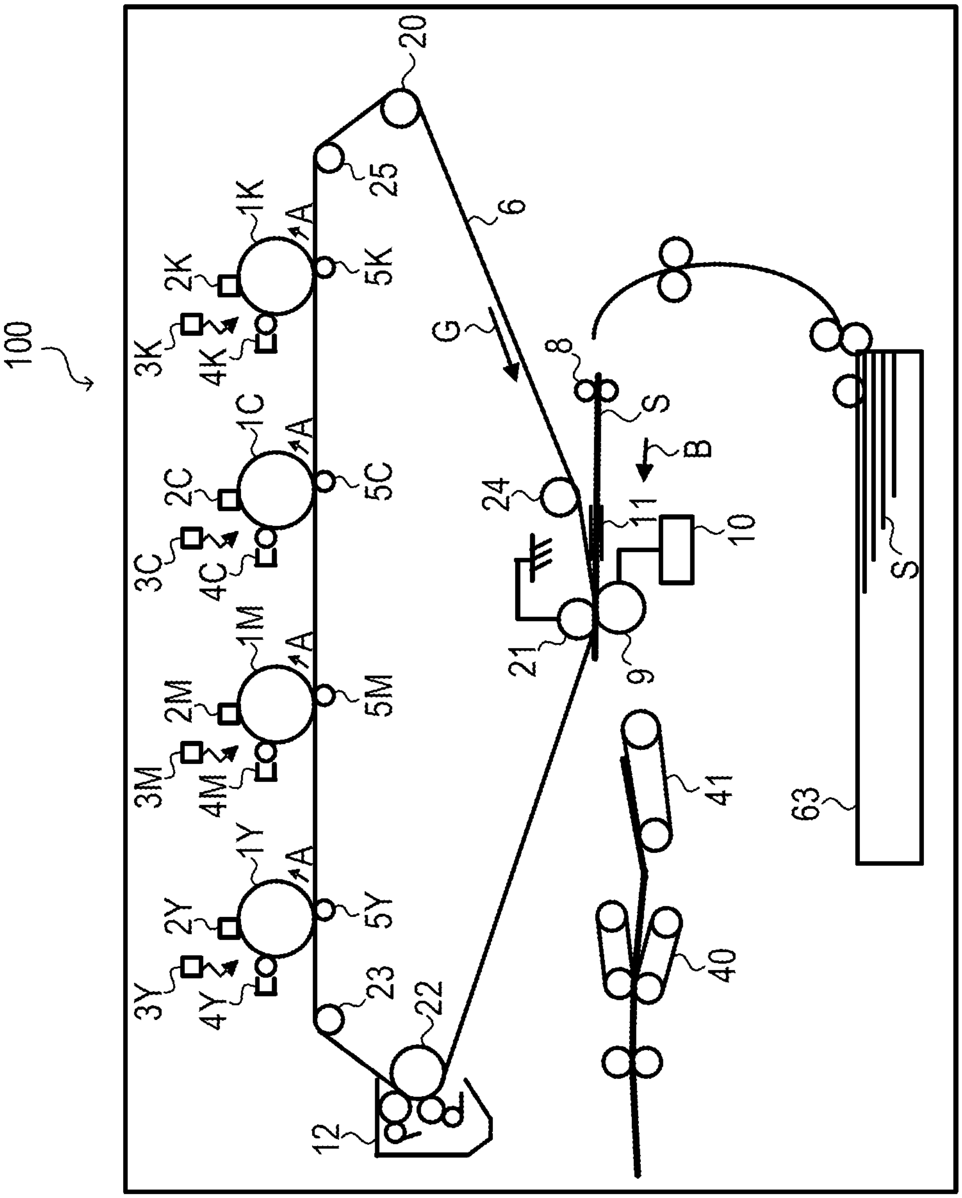
FIG. 1 is a cross-sectional view of an image forming apparatus.

The embodiments of the present disclosure will now be described with reference to the accompanying drawings. It should be noted that dimensions, materials, and relative positions of components of an image forming apparatus 100 and a charge-eliminating apparatus 200 are not intended to limit the scope of the present disclosure to them only, unless specifically stated. In addition, those with the same reference numerals in each figure have the same structure or function, and duplicate descriptions thereof will be omitted accordingly.

<Image Forming Apparatus>

FIG. 1 is a cross-sectional view of the image forming apparatus 100. The image forming apparatus 100 forms an image on a recording medium (hereinafter referred to as a sheet) using an electrophotographic process. As shown in FIG. 1, photosensitive drums (latent image bearing members) 1Y, 1M, 1C, and 1K rotate in a direction indicated by the arrow A. The surfaces of the photosensitive drums 1Y, 1M, 1C, and 1K are uniformly charged by charging devices 2Y, 2M, 2C, and 2K. Exposure devices 3Y, 3M, 3C, and 3K expose the uniformly charged surfaces of the photosensitive drums 1Y, 1M, 1C, and 1K according to image information to form electrostatic latent images on the surfaces of the photosensitive drums 1Y, 1M, 1C, and 1K. Development devices 4Y, 4M, 4C, and 4K develop the electrostatic latent images with yellow (Y) toner, magenta (M) toner, cyan (C) toner, and black (K) toner, respectively, to form toner images on the surfaces of the photosensitive drums 1Y, 1M, 1C, and 1K.

In the embodiment, the development devices 4Y, 4M, 4C, and 4K use a reversal developing system in which toner is attached to the exposed portions of the electrostatic latent image so that the electrostatic latent image is developed.

An intermediate transfer belt 6 is arranged so as to abut on the surfaces of the photosensitive drums 1Y, 1M, 1C and 1K. The intermediate transfer belt 6 is stretched around a plurality of stretching rollers 20, 21, 22, 23, 24, and 25 and rotates at a rotational speed of 150 to 470 mm/sec in a direction indicated by the arrow G.

In the embodiment, the stretching roller 20 is a tension roller that maintains the tension of the intermediate transfer belt 6 constant. The stretching roller 22 is a driving roller that drives the intermediate transfer belt 6.

The stretching roller 21 is an inner roller for secondary transfer. An outer roller 9 for secondary transfer is arranged opposite to the stretching roller 21 through the intermediate transfer belt 6. The outer roller 9 for secondary transfer nips the sheet S at a secondary transfer nip (secondary transfer portion) between the outer roller 9 for secondary transfer and the intermediate transfer belt 6 and conveys the sheet.

Primary transfer rollers 5Y, 5M, 5C and 5K are arranged opposite to the photosensitive drums 1Y, 1M, 1C and 1K through the intermediate transfer belt 6 to form a primary transfer nip (primary transfer portion) between the intermediate transfer belt 6 and the photosensitive drums 1Y, 1M, 1C and 1K. In synchronization with the toner images of respective colors on the surfaces of the photosensitive drums 1Y, 1M, 1C and 1K being conveyed to respective primary transfer nips, a constant voltage controlled transfer bias of reverse polarity to the toner images is applied to the primary transfer rollers 5Y, 5M, 5C and 5K. Thus, the toner images on the surfaces of the photosensitive drums 1Y, 1M, 1C, and 1K are transferred onto the intermediate transfer belt 6 (primary transfer).

A registration roller 8 conveys the sheet S to the secondary transfer nip in synchronization with the toner images on the intermediate transfer belt 6 being transferred to the secondary transfer nip. A pre-secondary-transfer conveyance guide 11 improves the conveyance accuracy when the sheet S is conveyed to the secondary transfer nip. A high-voltage application unit 10 applies a constant-voltage-controlled transfer bias of reverse polarity to the toner image to the outer roller 9 for secondary transfer. Thus, the toner image on the intermediate transfer belt 6 is transferred onto the sheet S (secondary transfer). The sheet S on which the toner image is transferred is conveyed to a fixing device 40 by a pre-fixing conveyance device 41. In the pre-fixing conveyance device 41, a belt body is rotated, and the sheet S is placed on the belt body and conveyed. The fixing device 40 fixes the toner image to the sheet S by heating and pressurizing the sheet S. A belt cleaning device 12 electrostatically recovers secondary transfer residual toner on the intermediate transfer belt 6 and cleans the intermediate transfer belt 6. The cleaned intermediate transfer belt 6 is repeatedly used for image formation.

<Charge-Eliminating Apparatus>

Figure 2:
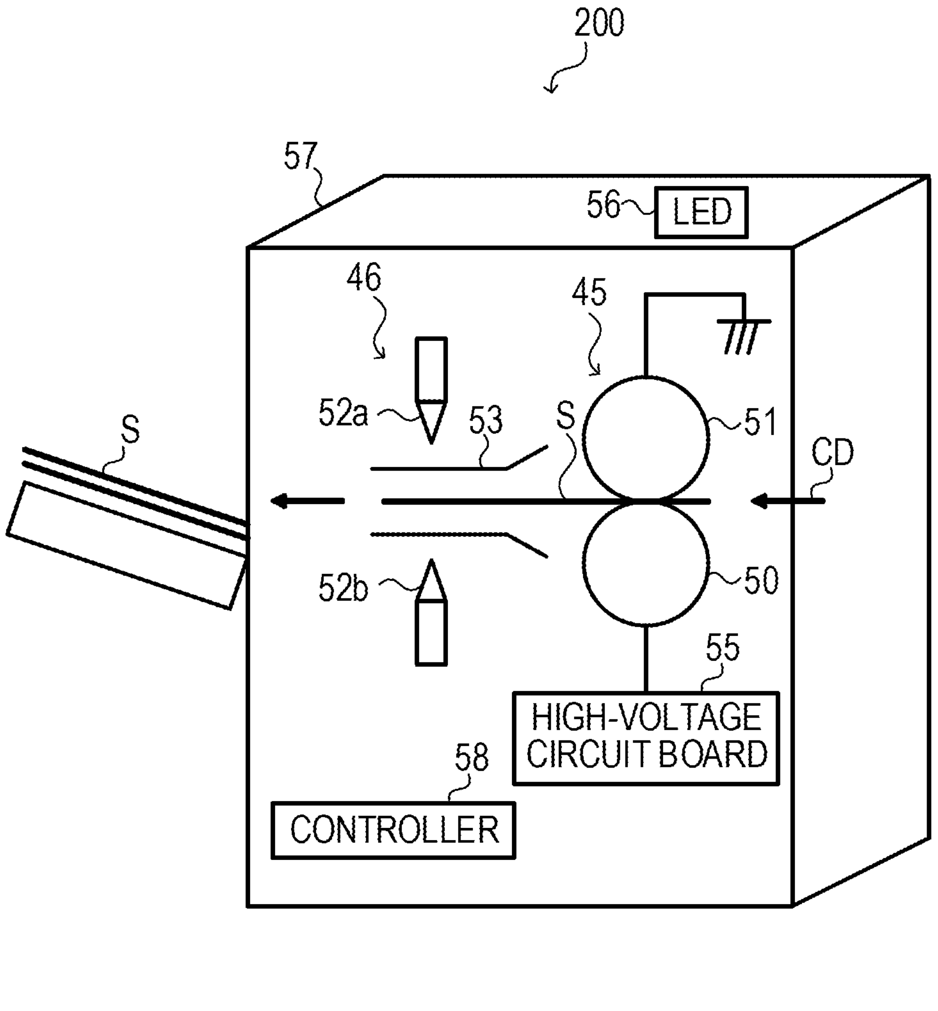
FIG. 2 is a schematic view of a charge-eliminating apparatus.
Figure 11:
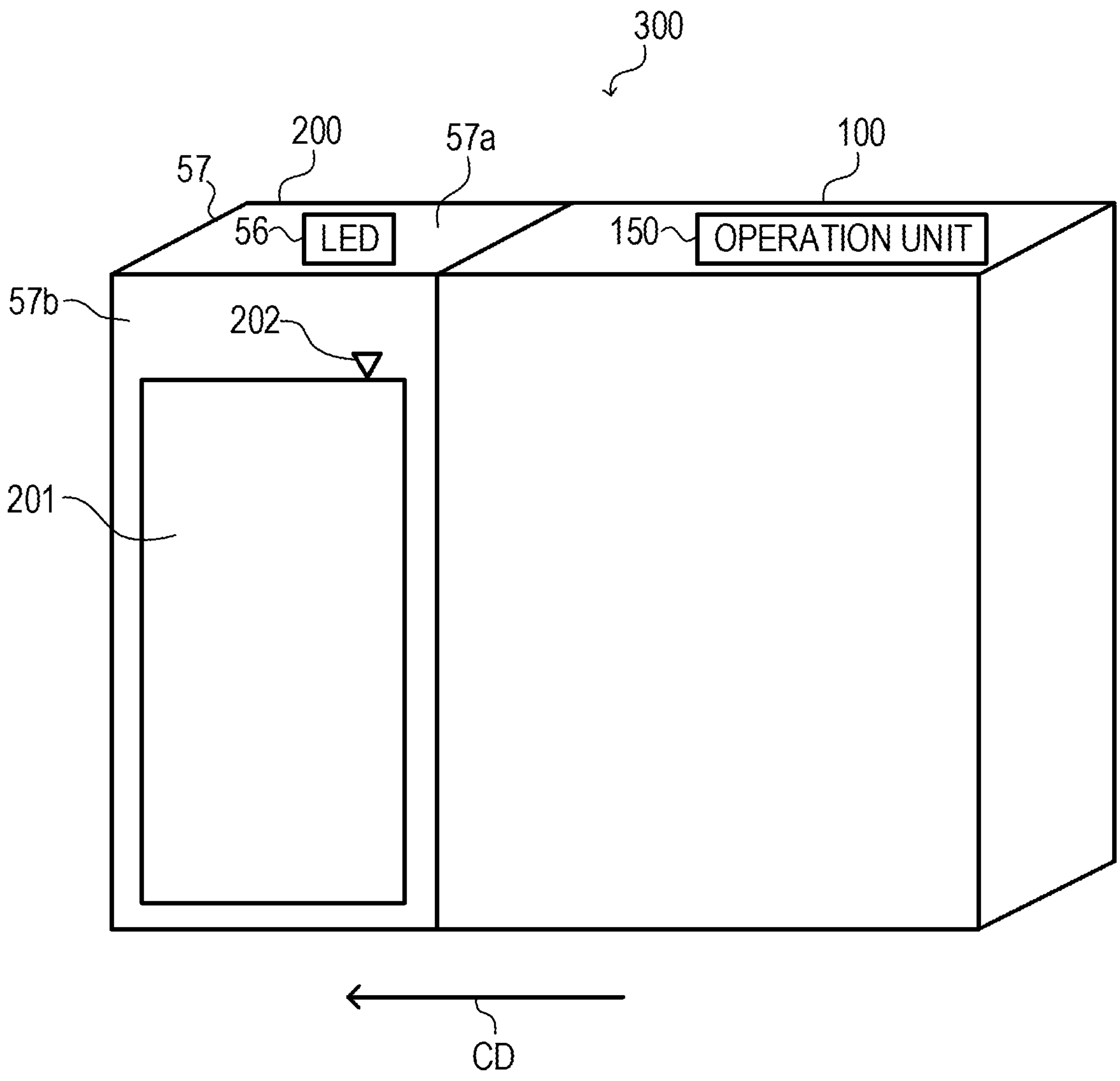
FIG. 11 is a view showing an image forming system.

FIG. 2 is a schematic view of a charge-eliminating apparatus 200. The charge-eliminating apparatus 200 is disposed downstream of the image forming apparatus 100 with respect to the conveyance direction CD of the sheet S. The charge-eliminating apparatus 200 receives the sheet S, on which the image is formed, from the image forming apparatus 100, and eliminates charge of the sheet S as a medium to be performed charge elimination. The charge-eliminating apparatus 200 may be directly connected to the image forming apparatus 100, or may be connected to the image forming apparatus 100 via a post-processing apparatus such as an inserter. In such a case, the image forming apparatus 100 including all apparatuses disposed upstream of the charge-eliminating apparatus 200 are referred to as an image forming apparatus. FIG. 11 is a view showing the image forming system 300. The image forming system 300 includes the image forming apparatus 100 and the charge-eliminating apparatus 200 disposed downstream of the image forming apparatus 100 with respect to the conveyance direction CD of the sheet S. The image forming apparatus 100 and the charge-eliminating apparatus 200 may be integrally formed to constitute the image forming apparatus 100.

The charge-eliminating apparatus 200 has a frame (housing) 57. The frame 57 accommodates a charge-eliminating roller pair 45, an ionizer 46, a conveyance guide 53, a high-voltage circuit board 55, and a controller 58 which controls the entire charge-eliminating apparatus 200. The frame 57 is provided with an LED (light emitting diode) 56 as an indicating portion indicating a state of the ionizer 46. The LED 56 is arranged on an exterior surface of the frame 57 so that a user can check indication contents of the LED 56 from the outside of the frame 57.

The charge-eliminating roller pair 45 is a contact charge eliminating unit configured to contact the sheet S to eliminate charge of the sheet S.

The charge-eliminating roller pair 45 is a conveying member configured to receive a sheet ejected from the image forming apparatus 100 and convey the sheet. The charge-eliminating roller pair 45 includes a charge-eliminating roller 50 and a charge-eliminating opposed roller 51 disposed opposite to the charge-eliminating roller 50. The charge-eliminating roller 50 and the charge-eliminating opposed roller 51 are brought into pressure contact with each other to form a charge-eliminating nip. The high-voltage circuit board 55 generates high voltage and applies the high voltage to the charge-eliminating roller 50. The charge-eliminating roller 50 and the charge-eliminating opposed roller 51 sandwich the sheet S at the charge-eliminating nip and eliminate charge of the sheet S while conveying the sheet S. The charge-eliminating apparatus 200 may have an inlet roller pair as a conveying member disposed upstream of the charge-eliminating roller pair 45 and configured to receive the sheet ejected from the image forming apparatus 100 and convey the sheet. In the embodiment, the charge-eliminating roller pair 45 is disposed upstream of the ionizer 46 in the conveyance direction CD.

The ionizer 46 is disposed downstream of the charge-eliminating roller pair 45 in the conveyance direction CD of the sheet S. The ionizer 46 has electrode needles (charge-eliminating needles) 52*a* and 52*b* disposed vertically across the conveyance guide 53 forming a conveyance path. The electrode needle 52*a* (first charge-eliminating member) is disposed facing an upper surface (first surface) of the sheet S to be conveyed. The electrode needle 52*b* (second charge-eliminating member) is disposed facing a lower surface (second surface) opposite to the upper surface of the sheet S to be conveyed. The ionizer 46 is a non-contact charge eliminating unit configured to eliminate charge of the sheet S without contacting the sheet S passing through the conveyance guide 53. The ionizer 46 of the embodiment uses a corona charge-eliminating system in which an AC high voltage (AC voltage) is applied to the electrode needles 52*a* and 52*b* to alternately generate + ion (cation) and − ion (anion). By alternately irradiating the front and back surfaces of the sheet S with + ion and − ion from the electrode needles 52*a* and 52*b* of the ionizer 46 disposed above and below the sheet S, the front and back surfaces of the sheet S are simultaneously performed charge elimination regardless of the polarity of the charge of the sheet S. That is, in the embodiment, the electrode needles 52*a* and 52*b* are disposed at the same position in the conveyance direction CD.

The LED 56 turns on, blinks, and turns off according to the state of the ionizer 46. The LED 56 is mounted on an upper surface 57*a* of an exterior surface of the frame 57 so that the user can check the state of the LED 56 turning on, blinking, and turning off from the outside of the frame 57. The LED 56 may be mounted on a front surface 57*b* of the exterior surface of the frame 57. In the present embodiment, the upper surface 57*a* is an upward-facing surface in the vertical direction of the exterior surface of the frame 57. In addition, the front surface 57*b* is a surface in the exterior surface of the frame 57 that faces toward the front side of the charge-eliminating apparatus 200. That is, the front surface 57*b* includes an inclined surface so as to intersect in the vertical direction.

The sheet S conveyed from the image forming apparatus 100 is first subjected to the coarse elimination of the electrostatic charge of the sheet S at the charge-eliminating nip between the charge-eliminating roller 50 and the charge-eliminating opposed roller 51. The high voltage applied to the charge-eliminating roller 50 has a polarity opposite to the voltage applied to the outer roller 9 for secondary transfer. Next, the ionizer 46 removes the charge from the sheet S that cannot be eliminated by the charge-eliminating roller pair 45. The sheet S performed charge elimination by the charge-eliminating roller pair 45 and the ionizer 46 is ejected to the outside of the charge-eliminating apparatus 200.

Figure 3:
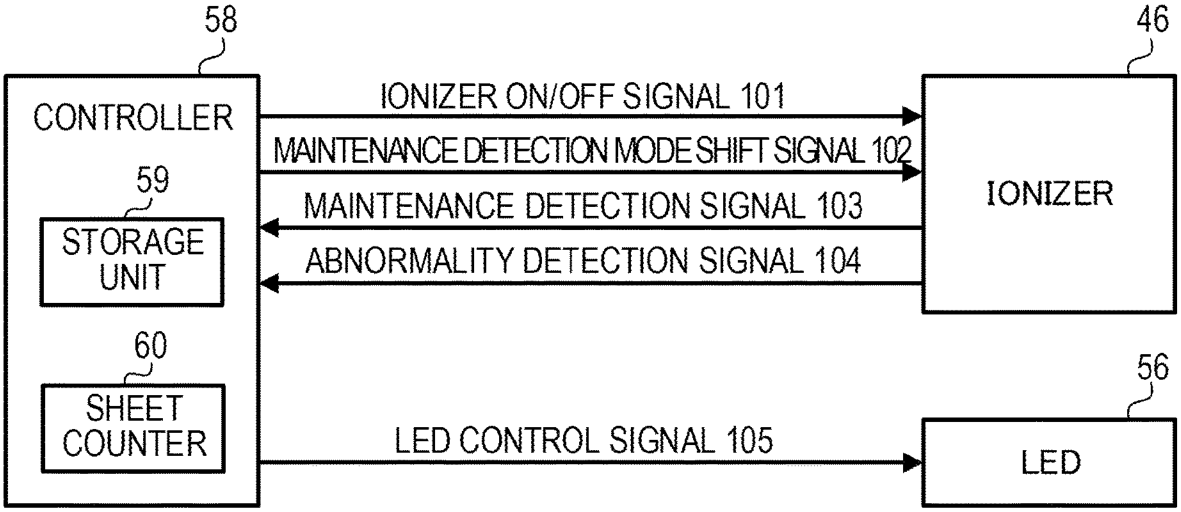
FIG. 3 is a block diagram showing an ionizer, an LED and a controller.

FIG. 3 is a block diagram showing the ionizer 46, the LED 56, and the controller 58. The ionizer 46 is switched between an ON state for generating ions and an OFF state for stopping the ion generation in accordance with an ionizer ON/OFF signal 101 output from the controller 58. In a case in which the ionizer ON/OFF signal 101 is at an H-level (high level), the ionizer 46 enters the ON state for generating ions. In a case in which the ionizer ON/OFF signal 101 is at an L-level (low level), the ionizer 46 enters the OFF state for stopping the ion generation. The controller 58 controls the ionizer 46 by switching the ionizer ON/OFF signal 101 at a predetermined timing, and switches the state of ionizer 46 between the ion generation state and the ion stop state.

When a maintenance detection mode shift signal 102 output from the controller 58 is switched from an L-level to an H-level as a trigger, the ionizer 46 shifts to the maintenance detection mode in which maintenance detection is performed to determine whether maintenance is required or not. The ionizer 46 determines whether maintenance is required or not during the maintenance detection mode. The necessity (required or not) of maintenance is reflected in a maintenance detection signal (alarm signal) 103 as a predetermined signal.

The maintenance detection signal 103 of an L-level indicates that maintenance of the ionizer 46 is not required. The maintenance detection signal 103 of an H-level indicates that the maintenance is required for the ionizer 46. The ionizer 46 outputs the maintenance detection signal 103 to the controller 58.

The controller 58 switches the maintenance detection mode shift signal 102 from the L-level to the H-level at a predetermined timing to shift the ionizer 46 to the maintenance detection mode. In a case in which the controller 58 receives the maintenance detection signal 103 of the H-level from the ionizer 46, the controller 58 determines that the maintenance is required for the ionizer 46. In a case in which the controller 58 determines that the maintenance is required for the ionizer 46, the controller 58 alternately switches an LED control signal 105 between an H-level and an L-level to blink the LED 56.

The ionizer 46 can detect abnormalities such as an abnormal charge elimination that occurs when a conductor approaches the vicinity of the electrode needles 52*a* and 52*b*. In a case in which the ionizer 46 is operating normally, the ionizer 46 outputs an abnormal detection signal (alarm signal) 104 of an L-level to the controller 58. In a case in which the ionizer 46 detects an abnormality, the ionizer 46 outputs the abnormal detection signal 104 of an H-level to the controller 58. In a case in which the controller 58 receives the abnormal detection signal 104 of the H-level when the ionizer ON/OFF signal 101 is at the H-level, the controller 58 determines that the ionizer 46 is in an abnormal state. When the controller 58 detects the abnormality of the ionizer 46, the controller 58 switches the LED control signal 105 to the H-level to turn the LED 56 on.

In a case in which the controller 58 determines that the maintenance is required for either of the electrode needles 52*a* and 52*b* of the ionizer 46 arranged vertically on the upside and downside, the controller 58 blinks the LED 56. In a case in which the controller 58 determines that either of the electrode needles 52*a* and 52*b* is in the abnormal state, the controller 58 turns the LED 56 on. Since the ionizer 46 is disposed inside the frame 57, it is difficult for the user to visually inspect the ionizer 46 to determine the necessity of maintenance for the ionizer 46 or abnormality of the ionizer 46. Therefore, by providing the LED 56 (indicating portion) on the frame 57 so that the user can visually see the indication contents from the outside of the frame 57, it is possible to indicate to the user that the maintenance is required for the ionizer 46 at an appropriate timing. As a result, since the user can recognize the necessity of maintenance at the appropriate timing, it is possible to prevent early deterioration of the electrode needles 52*a* and 52*b* due to excessive maintenance and insufficient charge elimination ability due to insufficient maintenance. According to the embodiment, the user can easily confirm the necessity of maintenance of the ionizer 46. The abnormal state of the ionizer 46 is, for example, a state in which the ionizer 46 has failed so as not to eliminate charge of a sheet. In the embodiment, the LED 56 provided on the charge-eliminating apparatus 200 functions as an indicating portion configured to indicate to the user whether maintenance is required or not for the ionizer 46. However, the indicating portion is not limited to this, for example, information (message) indicating whether maintenance is required or not for the ionizer 46 may be displayed on a display of an operation unit 150 (see FIG. 11) provided on the image forming apparatus 100.

Figure 4:
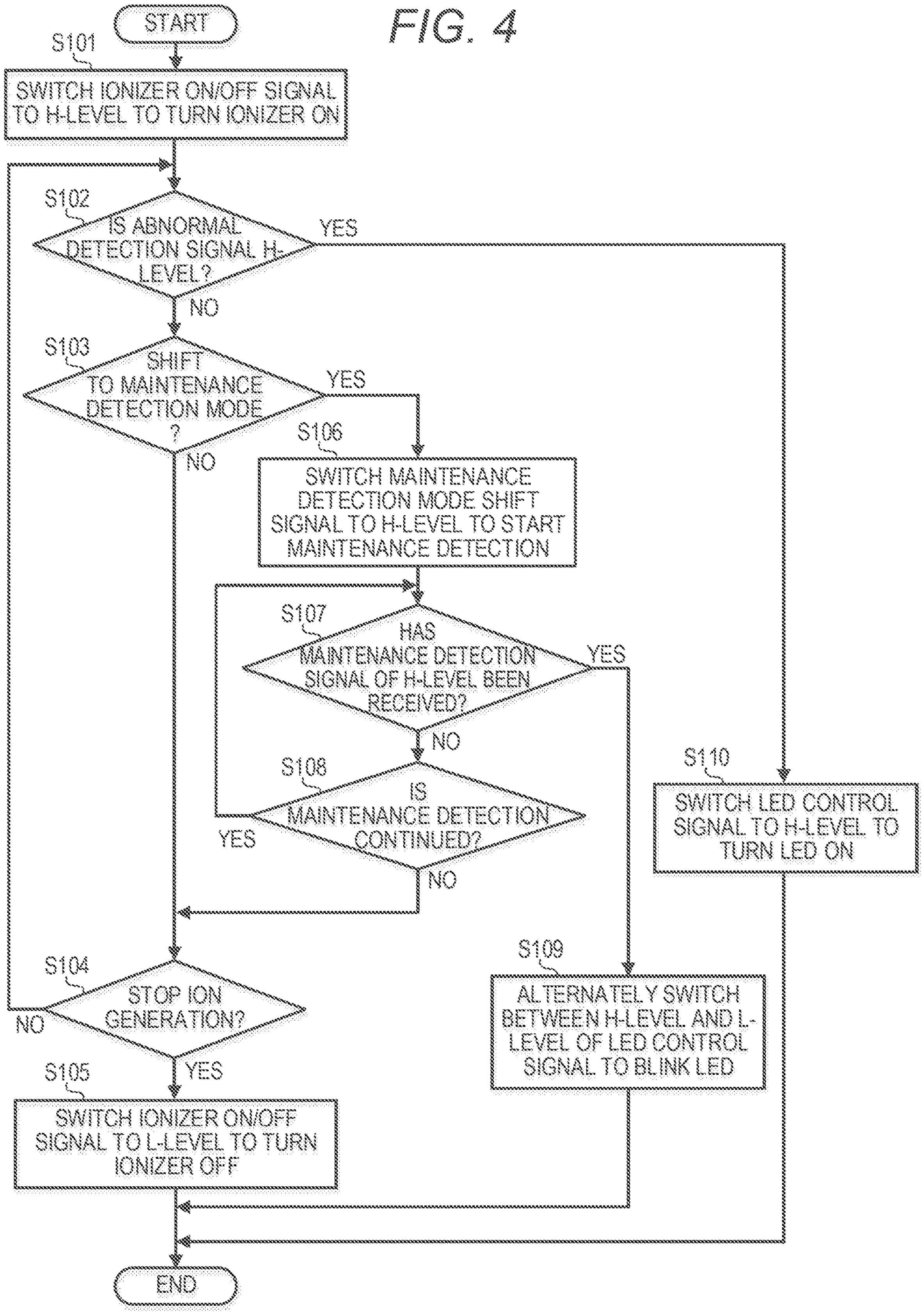
FIG. 4 is a flowchart of a control operation of the ionizer and LED.

FIG. 4 is a flowchart of a control operation of the ionizer 46 and the LED 56. The controller 58 performs the control operation of the ionizer 46 and the LED 56 according to a program stored in a storage unit 59. When the control operation of the ionizer 46 and the LED 56 is started, the controller 58 switches the ionizer ON/OFF signal 101 from the L-level to the H-level to put the ionizer 46 into the ON state (S101). The ionizer 46 starts ion generation. The controller 58 determines whether or not the abnormal detection signal 104 is at the H-level (S102). In a case in which the abnormal detection signal 104 is at the H-level (YES in S102), the controller 58 switches the LED control signal 105 to the H-level to turn the LED 56 on (S110), and ends the control operation.

In the embodiment, in the case in which the ionizer 46 is abnormal, the indication contents are indicated by the LED

56 in a pattern (second indication pattern) for turning the LED 56 on. However, in the case in which maintenance is required for the ionizer 46, the indication contents may be indicated by the LED 56 in the pattern for blinking the LED 56. The LED 56 may indicate the indication contents corresponding to the abnormal detection signal 104 output from the ionizer 46 in a predetermined pattern.

In a case in which the abnormal detection signal 104 is at the L-level (NO in S102), the controller 58 determines whether or not to shift the mode to the maintenance detection mode (S103). In a case in which the mode is not shifted to the maintenance detection mode (NO in S103), the controller 58 advances the process to S104. On the other hand, in a case in which the mode is shifted to the maintenance detection mode (YES in S103), the controller 58 switches the maintenance detection mode shift signal 102 from the L-level to the H-level to start maintenance detection (maintenance required determination control) (S106). The controller 58 determines whether the maintenance detection signal 103 of the H-level has been received from the ionizer 46 (S107). In a case in which the maintenance detection signal 103 of the H-level has been received from the ionizer 46 (YES in S107), since the maintenance is required for the ionizer 46, the controller 58 advances the process to S109. The controller 58 alternately switches the H-level and the L-level of the LED control signal 105 to blink the LED 56 (S109), and ends the control operation.

In the embodiment, in a case in which maintenance is required for the ionizer 46, the indication contents are indicated by the LED 56 in a pattern (first indication pattern) for blinking the LED 56. However, in the case in which maintenance is required for the ionizer 46, the indication contents may be indicated by the LED 56 in a pattern for turning the LED 56 on. One of the first indication pattern and the second indication pattern may be the pattern for turning the LED 56 on, and the other may be the pattern for blinking the LED 56. The LED 56 may indicate the indication contents corresponding to the maintenance detection signal 103 output from the ionizer 46 in a predetermined pattern.

In S107, a case in which the maintenance detection signal 103 of the L-level is received from the ionizer 46 (NO in S107), the controller 58 determines whether or not to continue the maintenance detection (S108). In a case in which the maintenance detection is continued (YES in S108), the controller 58 returns the process to S107. In a case in which the maintenance detection is interrupted (NO in S108), the controller 58 advances the process to S104. The controller 58 determines whether or not to stop ion generation by the ionizer 46 (S104). In a case in which the ion generation is not stopped (NO in S104), the controller 58 returns the process to S102. In a case in which the ion generation is stopped (YES in S104), the controller 58 switches the ionizer ON/OFF signal 101 from the H-level to the L-level to turn the ionizer 46 off (S105), and ends the control operation.

Figure 5:
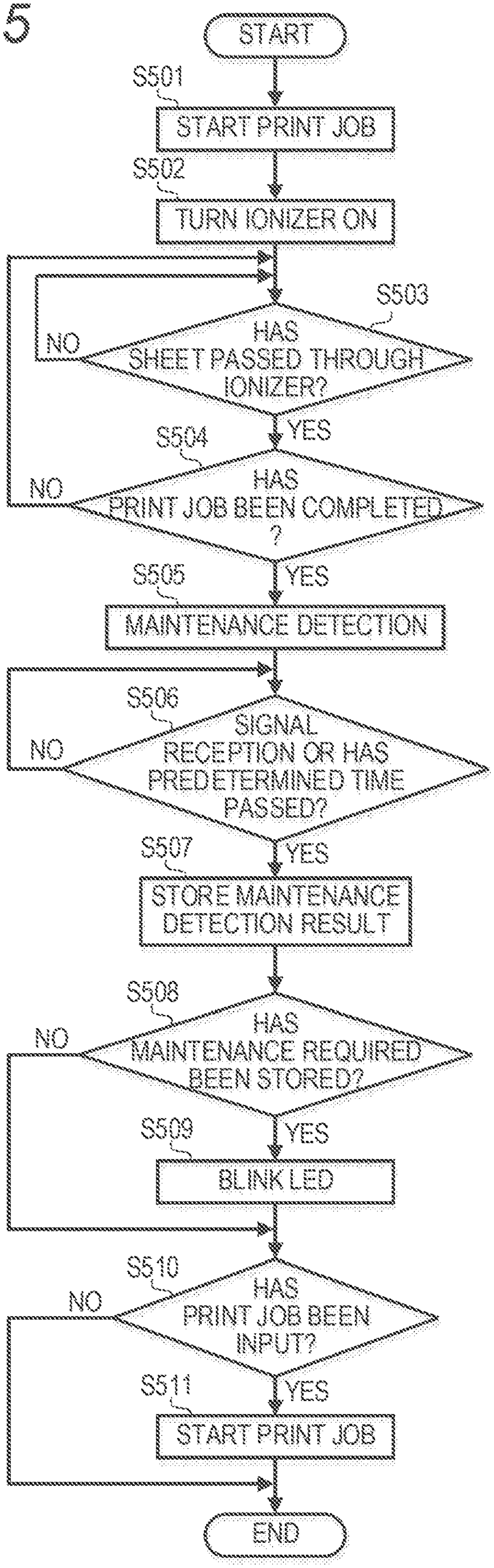
FIG. 5 is a flowchart of a maintenance detection full control operation at an end of a print job.
Figure 6:
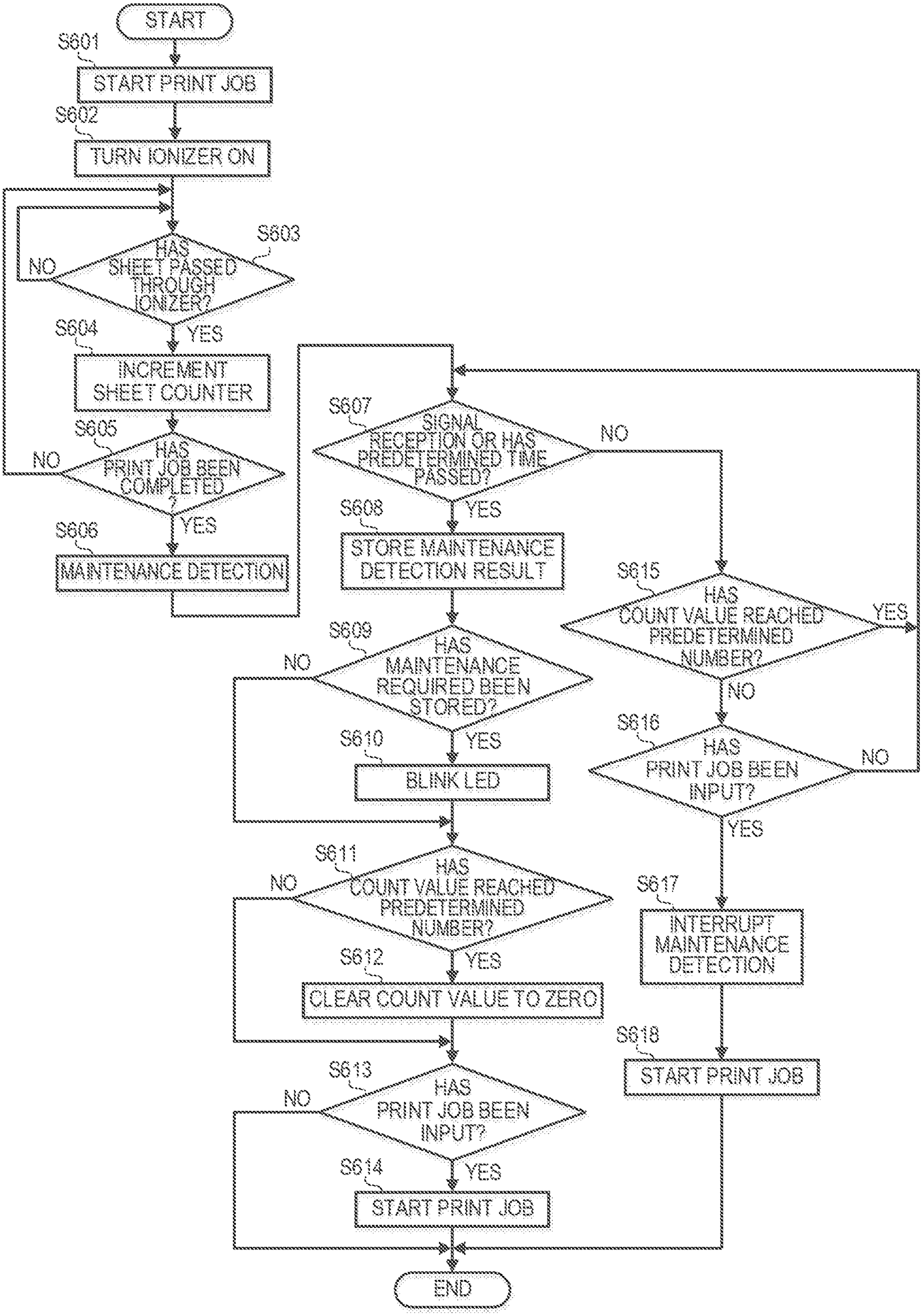
FIG. 6 is a flowchart of a maintenance detection interruption control operation at the end of the print job.

Referring to FIG. 5 and FIG. 6, control timing of the ionizer ON/OFF signal 101 and the maintenance detection mode shift signal 102 in the embodiment will be described. When a print job is started, the controller 58 switches the ionizer ON/OFF signal 101 from the L-level to the H-level to put the ionizer 46 into the ON state. When the print job is completed, the controller 58 switches the maintenance detection mode shift signal 102 from the L-level to the H-level to start maintenance detection. In the maintenance detection, it is determined whether maintenance is required for the ionizer 46. A maintenance detection full control operation in which maintenance detection is continued until it is determined that the maintenance is required for the ionizer 46 within a predetermined time from the start of maintenance detection or until the predetermined time elapses will be described with reference to FIG. 5. A maintenance detection interruption control operation in which maintenance detection is interrupted when a print job has been input in the middle of the maintenance detection will be described with reference to FIG. 6.

For example, the user can select the maintenance detection full control operation shown in FIG. 5 and the maintenance detection interruption control operation shown in FIG. 6 from the operation unit 150 (FIG. 11) provided in the image forming apparatus 100 or the charge-eliminating apparatus 200. In the embodiment, both the maintenance detection full control operation shown in FIG. 5 and the maintenance detection interruption control operation shown in FIG. 6 are used, but the embodiment is not limited to this. The image forming system 300 may be configured to perform only one of the control operations.

FIG. 5 is a flowchart of the maintenance detection full control operation at the end of a print job. The controller 58 performs the maintenance detection full control operation in accordance with a program stored in the storage unit 59. When a print job has been input to the image forming apparatus 100, the image forming apparatus 100 starts the print job (image forming operation) (S501). When the print job is started, the controller 58 switches the ionizer ON/OFF signal 101 from the L-level to the H-level to put the ionizer 46 in the ON state (S502). The controller 58 determines whether the sheet S on which the image is formed has passed between the electrode needles 52*a* and 52*b* of the ionizer 46 (S503). In a case in which the sheet S has not passed through the ionizer 46 (NO in S503), the controller 58 returns the process to S503 and waits for the sheet S to pass through the ionizer 46. In a case in which the sheet S has passed through the ionizer 46 (YES in S503), the controller 58 determines whether the print job has been completed (S504). In a case in which the print job has not been not completed (NO in S504), the controller 58 returns the process to S503. In a case in which the print job has been completed (YES in S504), the controller 58 switches the maintenance detection mode shift signal 102 from the L-level to the H-level to start maintenance detection (maintenance required determination control) (S505), and proceeds the process to S506.

The controller 58 determines whether or not the maintenance detection signal 103 of the H-level has been received and whether or not the predetermined time has elapsed since the maintenance detection was started (S506). In a case in which the maintenance detection signal 103 of the H-level has not been received and the predetermined time has not elapsed (NO in S506), the controller 58 returns the process to S506 and continues the maintenance detection until the maintenance detection signal 103 of the H-level has been received or the predetermined time has elapsed. In a case in which the maintenance detection signal 103 of the H-level has been received or the predetermined time has elapsed without the maintenance detection signal 103 of the H-level having been received (YES in S506), the controller 58 stores the maintenance detection result in the storage unit 59 (S507). In a case in which the maintenance detection signal 103 of the H-level has been received, the controller 58 stores in the storage unit 59 as the maintenance detection result that the maintenance is required for the ionizer 46. In a case in which the predetermined time has elapsed while the maintenance detection signal 103 is at the L-level, it indicates that the maintenance detection can be performed for the predetermined time. In this case, the controller 58 stores in the storage unit 59 as the maintenance detection result that the maintenance is not required for the ionizer 46.

The controller 58 determines whether or not the maintenance is required for the ionizer 46 is stored in the storage unit 59 based on the maintenance detection result (S508). In a case in which it is stored in the storage unit 59 that the maintenance is required (YES in S508), the controller 58 alternately switches the H-level and the L-level of the LED control signal 105 to blink the LED 56 (S509), and prompts the user to clean the ionizer 46. The controller 58 advances the process to S510. On the other hand, in a case in which it is stored in the storage unit 59 that the maintenance is not required (NO in S508), the controller 58 advances the process to S510.

The controller 58 determines whether a print job has been input to the image forming apparatus 100 (S510). In a case in which the print job has been input (YES in S510), the image forming apparatus 100 starts the print job (S511) and the controller 58 ends the maintenance detection full control operation. In a case in which the print job has not been input (NO in S510), the controller 58 ends the maintenance detection full control operation.

FIG. 6 is a flowchart of the maintenance detection interruption control operation at the end of a print job. The controller 58 performs the maintenance detection interruption control operation in accordance with a program stored in the storage unit 59. When a print job has been input to the image forming apparatus 100, the image forming apparatus 100 starts the print job (image forming operation) (S601). When the print job is started, the controller 58 switches the ionizer ON/OFF signal 101 from the L-level to the H-level to put the ionizer 46 into the ON state (S602). The controller 58 determines whether the sheet S on which the image is formed has passed between the electrode needles 52*a* and 52*b* of the ionizer 46 (S603). In a case in which the sheet S has not passed through the ionizer 46 (NO in S603), the controller 58 returns the process to S603 and waits for the sheet S to pass through the ionizer 46. In a case in which the sheet S has passed through the ionizer 46 (YES in S603), the controller 58 increments a count value of a sheet counter 60 (S604).

Next, the controller 58 determines whether or not the print job has been completed (S605). In a case in which the print job has not been completed (NO in S605), the controller 58 returns the process to S603 and repeats the process of S603 and S604. In a case in which the print job has been completed (YES in S605), the controller 58 switches the maintenance detection mode shift signal 102 from the L-level to the H-level to start maintenance detection (S606) and advances the process to S607.

The controller 58 determines whether or not the maintenance detection signal 103 of the H-level has been received and whether or not a predetermined time has elapsed since the maintenance detection was started (S607). In a case in which the maintenance detection signal 103 of the H-level has been received or in a case in which the predetermined time elapses without receiving the maintenance detection signal 103 of the H-level (YES in S607), the controller 58 stores the maintenance detection result in the storage unit 59 (S608).

The controller 58 determines, based on the maintenance detection result, whether or not it is stored in the storage unit 59 that the maintenance is required for the ionizer 46 (S609). In a case in which it is stored in the storage unit 59 that the maintenance is required (YES in S609), the controller 58 alternately switches the H-level and L-level of the LED control signal 105 to blink the LED 56 (S610), and prompts the user to clean the ionizer 46. The controller 58 advances the process to S611. On the other hand, in a case in which it is stored in the storage unit 59 that the maintenance is not required (NO in S609), the controller 58 advances the process to S611.

The controller 58 determines whether or not the count value of the sheet counter 60 has reached a predetermined number (S611). In a case in which the count value has reached the predetermined number (YES in S611), it is determined that maintenance detection (maintenance detection full control operation) performed at a predetermined number interval has been performed. The controller 58 clears the count value of the sheet counter 60 to 0 (S612), and advances the process to S613. In a case in which the count value of the sheet counter 60 has not reached the predetermined number (NO in S611), the controller 58 advances the process to S613 while maintaining the count value of the sheet counter 60.

The controller 58 determines whether or not a print job has been input to the image forming apparatus 100 (S613). In a case in which the print job has been input (YES in S613), the image forming apparatus 100 starts the print job (S614), and the controller 58 ends the maintenance detection interruption control operation. In a case in which the print job has not been input (NO in S613), the controller 58 ends the maintenance detection interruption control operation.

In S607, in a case in which the maintenance detection signal 103 of the H-level has not been received and the predetermined time has not passed (that is, during maintenance detection) (NO in S607), the controller 58 advances the process to S615. The controller 58 determines whether or not the count value of the sheet counter 60 has reached the predetermined number (S615). The predetermined number may be set to, for example, the number of sheets requiring maintenance. In a case in which the count value reaches the predetermined number (YES in S615), the controller 58 returns the process to S607 and continues the maintenance detection until the maintenance detection signal 103 of the H-level has been received or the predetermined time has elapsed (maintenance detection full control operation).

In a case in which the count value of the sheet counter 60 has not reached the predetermined number (NO in S615), the controller 58 determines whether or not a print job has been input to the image forming apparatus 100 (S616). In a case in which the print job has not been input (NO in S616), the controller 58 returns the process to S607 and continues the maintenance detection. In a case in which the print job has been input (YES in S616), the controller 58 interrupts the maintenance detection (S617). The image forming apparatus 100 starts the print job (S618), and the controller 58 ends the maintenance detection interruption control operation.

In the embodiment, in a case in which the number of sheets performed charge elimination by the ionizer 46 has not reached the predetermined number, when the print job is input during the maintenance detection, the maintenance detection is interrupted. However, the maintenance detection interruption control operation is not limited to this. For example, in a case in which an integrated time of a charge-eliminating time for which the ionizer 46 eliminates charge of the sheet has not reached a predetermined time, when a print job is input during the maintenance detection, the maintenance detection may be interrupted.

Figure 7:
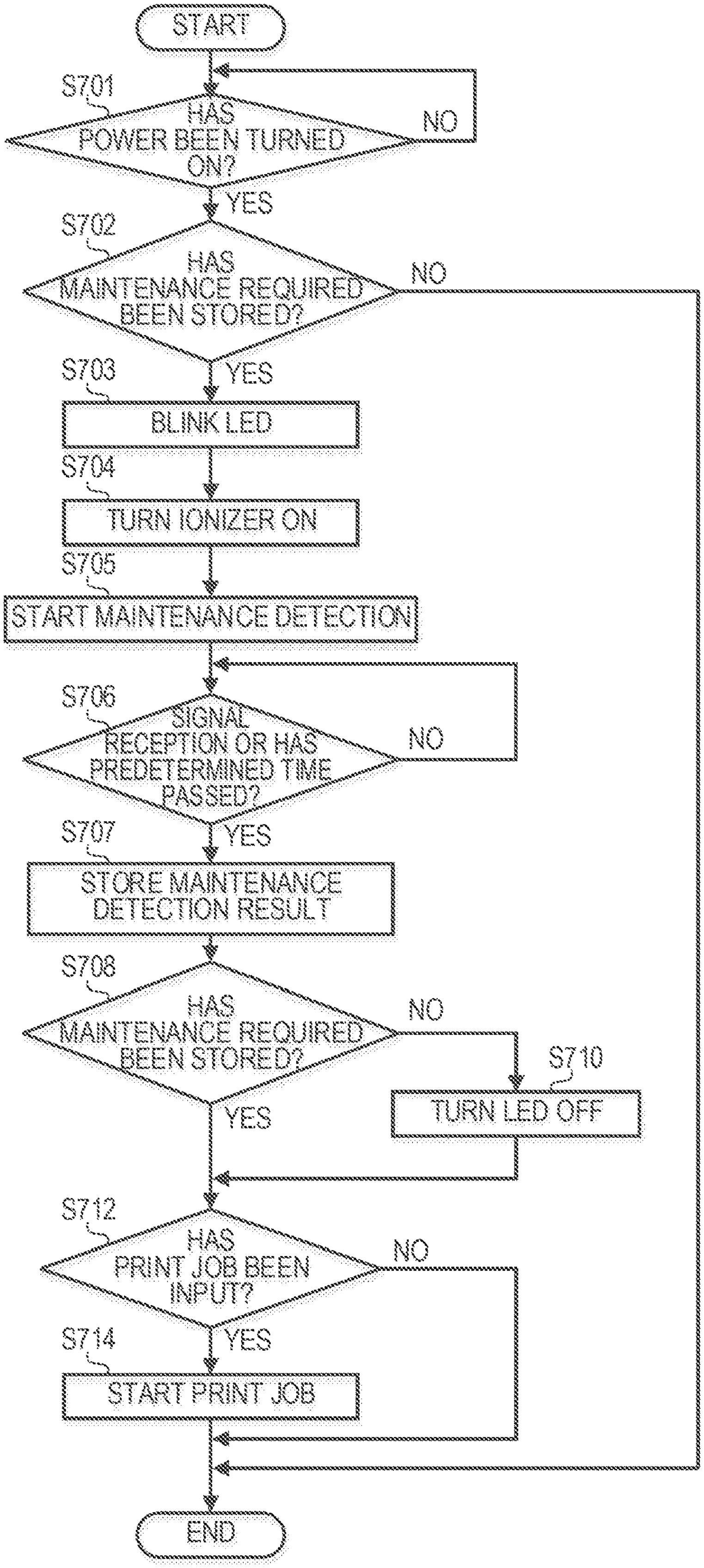
FIG. 7 is a flowchart of the maintenance detection full control operation when power is turned on to the charge-eliminating apparatus.
Figure 8:
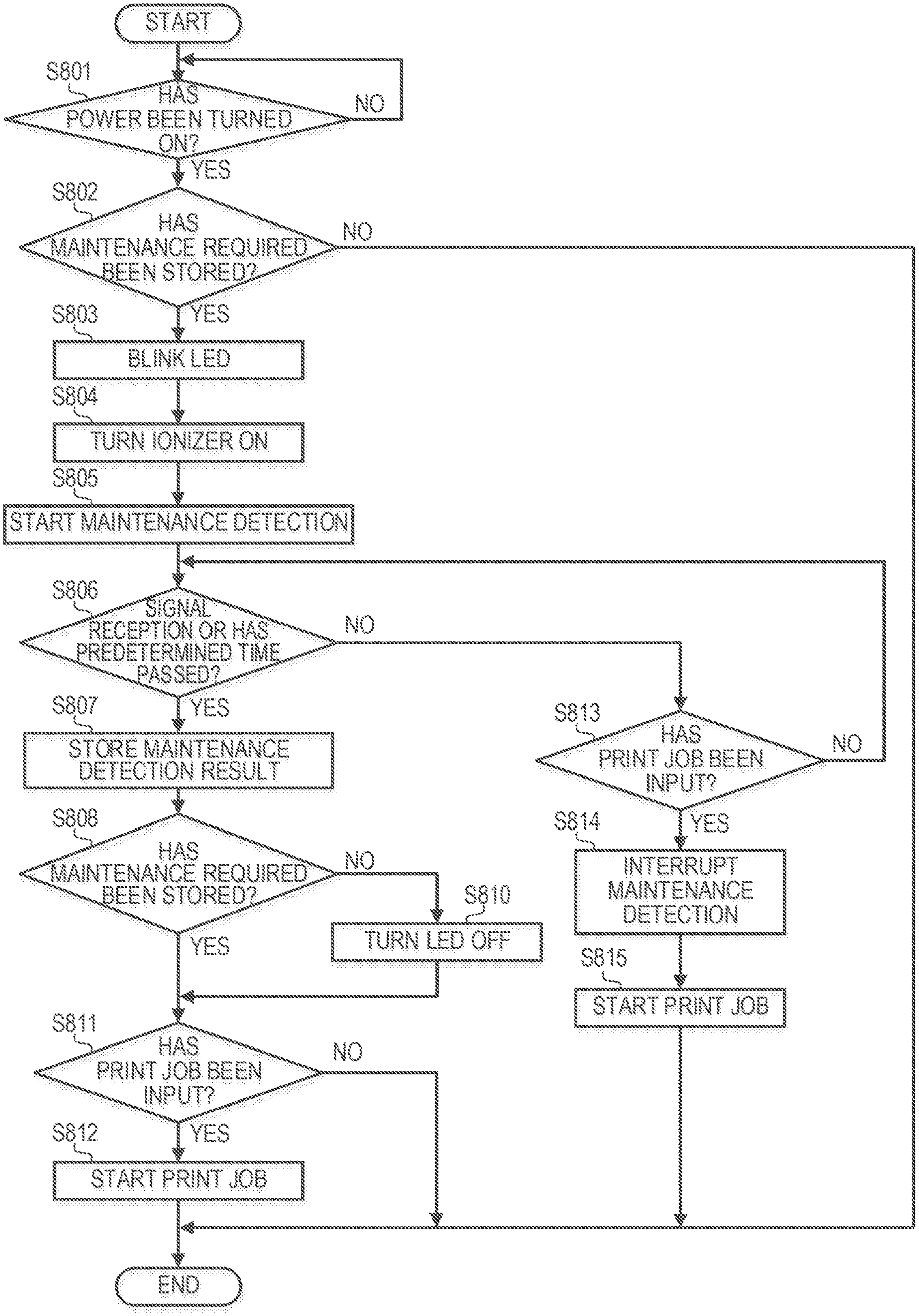
FIG. 8 is a flowchart of the maintenance detection interruption control operation when the power is turned on to the charge-eliminating apparatus.

Referring to FIG. 7 and FIG. 8, a timing of the maintenance detection of the ionizer 46 when the power is turned on to the charge-eliminating apparatus 200 of the embodiment will be described. In a case in which it is stored in the storage unit 59 that the maintenance is required for the ionizer 46 when the power is turned on to the charge-eliminating apparatus 200, the controller 58 performs the maintenance detection (maintenance required determination control) again.

When the maintenance detection mode shift signal 102 is switched from the L-level to the H-level, the maintenance detection is started. The maintenance detection full control operation in which the maintenance detection is continued until it is determined that the maintenance is required for the ionizer 46 within a predetermined time from the start of the maintenance detection or until the predetermined time elapses will be described with reference to FIG. 7. The maintenance detection interruption control operation in which the maintenance detection is interrupted when a print job is input in the middle of the maintenance detection will be described with reference to FIG. 8.

For example, the user can select the maintenance detection full control operation shown in FIG. 7 and the maintenance detection interruption control operation shown in FIG. 8 from the operation unit 150 (FIG. 11) provided on the image forming apparatus 100 or the charge-eliminating apparatus 200. In the embodiment, both the maintenance detection full control operation shown in FIG. 7 and the maintenance detection interruption control operation shown in FIG. 8 are used, but the embodiment is not limited to this. The image forming system 300 may be configured to perform only one of the control operations.

FIG. 7 is a flowchart of the maintenance detection full control operation when the power is turned on to the charge-eliminating apparatus 200. The controller 58 performs the maintenance detection full control operation in accordance with a program stored in the storage unit 59. In a case in which the power is turned on to the charge-eliminating apparatus 200 (YES in S701), the controller 58 determines whether or not it is stored in the storage unit 59 that the maintenance is required for the ionizer 46 (S702). The determination is made based on, for example, the maintenance detection result which is the result of the previous determination stored in the storage unit 59 in S507 in FIG. 5 or S608 in FIG. 6. In a case in which it is stored in the storage unit 59 that the maintenance is not required (NO in S702), the controller 58 ends the maintenance detection full control operation.

In a case in which it is stored in the storage unit 59 that the maintenance is required (YES in S702), the controller 58 alternately switches the H-level and the L-level of the LED control signal 105 to blink the LED 56 (S703). Next, the controller 58 switches the ionizer ON/OFF signal 101 from the L-level to the H-level to put the ionizer 46 into the ON state (S704). The controller 58 switches the maintenance detection mode shift signal 102 from the L-level to the H-level to start the maintenance detection (S705), and advances the process to S706.

The controller 58 determines whether or not the maintenance detection signal 103 of the H-level has been received and whether or not a predetermined time has elapsed since the maintenance detection was started (S706). In a case in which the maintenance detection signal 103 of the H-level has not been received and the predetermined time has not elapsed (NO in S706), the controller 58 returns the process to S706 and continues the maintenance detection until the maintenance detection signal 103 of the H-level has been received or the predetermined time has elapsed. In a case in which the maintenance detection signal 103 of the H-level has been received or the predetermined time has elapsed without the maintenance detection signal 103 of the H-level having been received (YES in S706), the controller 58 stores the maintenance detection result in the storage unit 59 (S707). In a case in which the maintenance detection signal 103 of the H-level has been received, the controller 58 stores in the storage unit 59 as the maintenance detection result that the maintenance is required for the ionizer 46. In a case in which the predetermined time has elapsed while the maintenance detection signal 103 remains at the L-level, the controller 58 stores in the storage unit 59 as the maintenance detection result that the maintenance is not required for the ionizer 46.

The controller 58 determines whether or not it is in the storage unit 59 that the maintenance is required for the ionizer 46 (S708). In a case in which it is stored in the storage unit 59 that the maintenance is required (YES in S708), the controller 58 advances the process to S712. On the other hand, in a case in which it is stored in the storage unit 59 that the maintenance is not required (NO in S708), it indicates that the maintenance (cleaning) of the ionizer 46 was performed. Therefore, the controller 58 switches the LED control signal 105 to the L-level to turn the LED 56 off (S710), and advances the process to S712.

The controller 58 determines whether or not a print job has been input to the image forming apparatus 100 (S712). In a case in which the print job has been input (YES in S712), the image forming apparatus 100 starts the print job (S714) and the controller 58 ends the maintenance detection full control operation. In a case in which the print job has not been input (NO in S712), the controller 58 ends the maintenance detection full control operation.

FIG. 8 is a flowchart of the maintenance detection interruption control operation when the power is turned on to the charge-eliminating apparatus 200. The controller 58 performs the maintenance detection interruption control operation in accordance with a program stored in the storage unit 59. When the power is turned on to the charge-eliminating apparatus 200 (S801), the controller 58 determines whether or not it is stored in the storage unit 59 that the maintenance is required for the ionizer 46 (S802). The determination is made based on, for example, the maintenance detection result which is the result of the previous determination stored in the storage unit 59 in S507 of FIG. 5 or S608 of FIG. 6. In a case in which it is stored in the storage unit 59 that the maintenance is not required (NO in S802), the controller 58 ends the maintenance detection interruption control operation.

In a case in which it is stored in the storage unit 59 that the maintenance is required (YES in S802), the controller 58 alternately switches the H-level and the L-level of the LED control signal 105 to blink the LED 56 (S803). Next, the controller 58 switches the ionizer ON/OFF signal 101 from the L-level to the H-level to put the ionizer 46 into the ON state (S804). The controller 58 switches the maintenance detection mode shift signal 102 from the L-level to the H-level to start the maintenance detection (S805), and advances the process to S806.

The controller 58 determines whether or not the maintenance detection signal 103 of the H-level has been received and whether or not a predetermined time has elapsed since the maintenance detection was started (S806). In a case in which the maintenance detection signal 103 of the H-level has been received or the predetermined time has elapsed without receiving the maintenance detection signal 103 of the H-level (YES in S806), the controller 58 stores the maintenance detection result in the storage unit 59 (S807).

The controller 58 determines, based on the maintenance detection result, whether or not it is stored in the storage unit 59 that the maintenance is required for the ionizer 46 (S808).

In a case in which it is stored in the storage unit 59 that the maintenance is required (YES in S808), the controller 58 advances the process to S811. In a case in which it is stored in the storage unit 59 that the maintenance is not required (NO in S808), it indicates that the maintenance (cleaning) of the ionizer 46 was performed. Therefore, the controller 58 switches the LED control signal 105 to the L-level to turn the LED 56 off (S810), and advances the process to S811.

The controller 58 determines whether a print job has been input to the image forming apparatus 100 (S811). In a case in which the print job has been input (YES in S811), the image forming apparatus 100 starts the print job (S812) and the controller 58 ends the maintenance detection interruption control operation. In a case in which the print job has not been input (NO in S811), the controller 58 ends the maintenance detection interruption control operation.

In S806, in a case in which the maintenance detection signal 103 of the H-level has not been received and the predetermined time has not elapsed (that is, during maintenance detection) (NO in S806), the controller 58 advances the process to S813. The controller 58 determines whether or not a print job has been input to the image forming apparatus 100 (S813). In a case in which the print job has not been input (NO in S813), the controller 58 returns the process to S806 and continues the maintenance detection. In a case in which the print job has been input (YES in S813), the controller 58 interrupts the maintenance detection (S814). The image forming apparatus 100 starts the print job (S815) and the controller 58 ends the maintenance detection interruption control operation.

Figure 9:
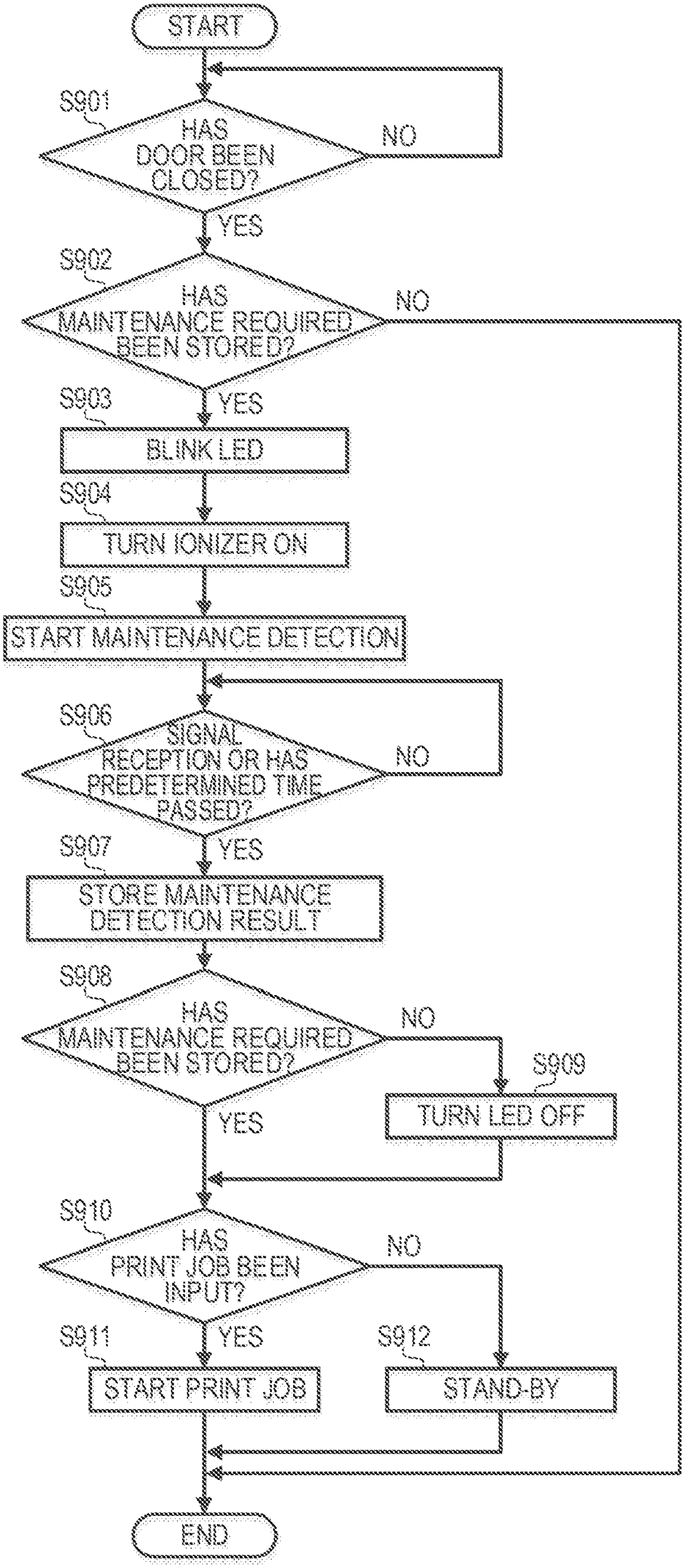
FIG. 9 is a flowchart of the maintenance detection full control operation when a door of the charge-eliminating apparatus is opened or closed.
Figure 10:
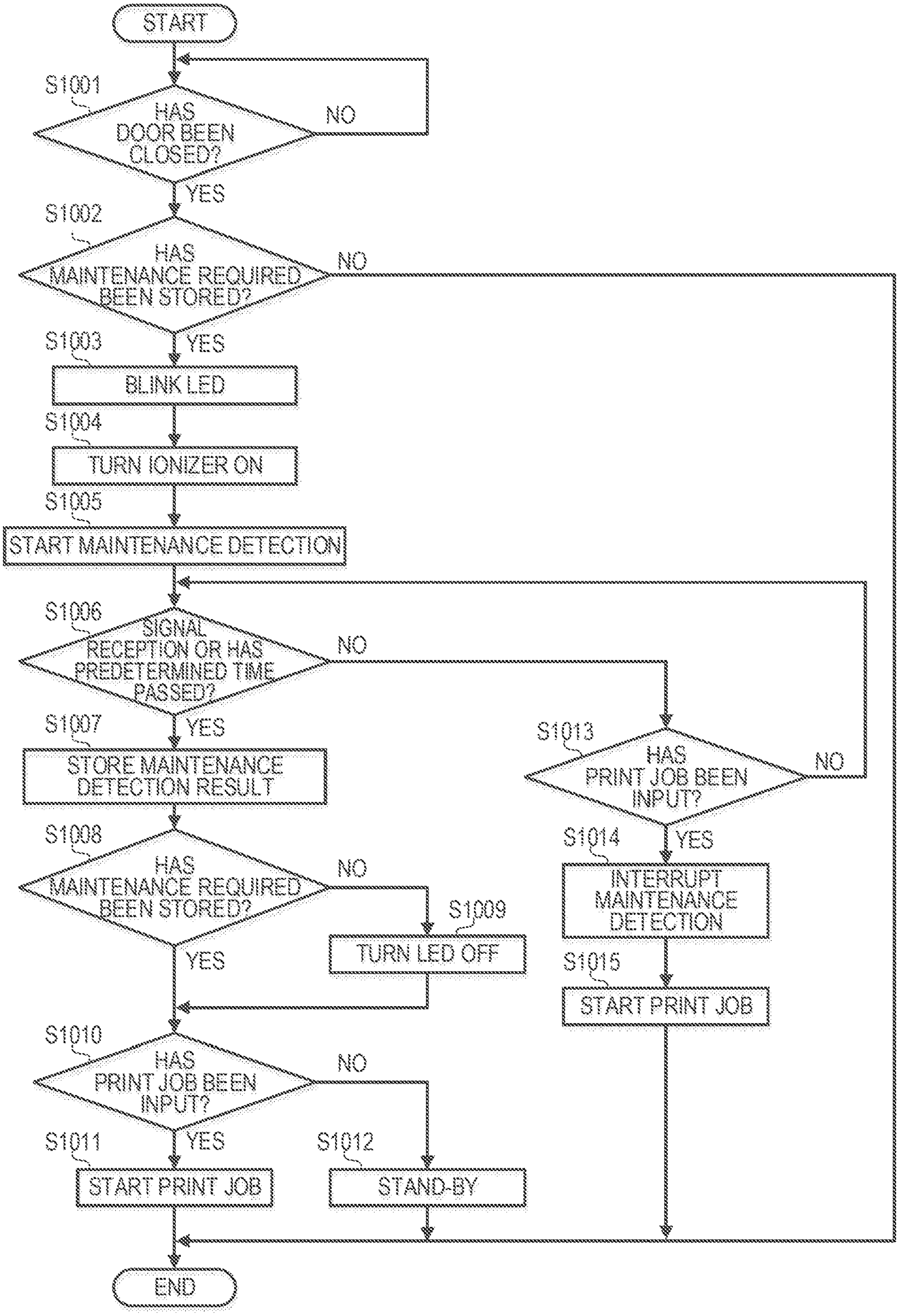
FIG. 10 is a flowchart of the maintenance detection interruption control operation when the door of the charge-eliminating apparatus is opened or closed.

Referring to FIG. 9 and FIG. 10, a timing of maintenance detection of the ionizer 46 when a door 201 (FIG. 11) of the charge-eliminating apparatus 200 of the embodiment is opened and closed will be described. The user can open the door 201 of the charge-eliminating apparatus 200 and access the ionizer 46 to perform maintenance work for the ionizer 46. The opening/closing of the door 201 of the charge-eliminating apparatus 200 is detected by a door sensor 202 (FIG. 11) provided in the charge-eliminating apparatus 200. In a case in which it is stored in the storage unit 59 that the maintenance is required for the ionizer 46 when the door 201 is opened and closed, the controller 58 performs the maintenance detection (maintenance required determination control) again.

When the maintenance detection mode shift signal 102 is switched from the L-level to the H-level, the maintenance detection is started. In the maintenance detection, it is determined whether the maintenance is required for the ionizer 46. A maintenance detection full control operation in which the maintenance detection is continued until it is determined that the maintenance is required for the ionizer 46 within a predetermined time from the start of the maintenance detection or until the predetermined time elapses will be described with reference to FIG. 9. A maintenance detection interruption control operation in which the maintenance detection is interrupted when a print job has been input in the middle of the maintenance detection will be described with reference to FIG. 10.

For example, the user can select the maintenance detection full control operation shown in FIG. 9 and the maintenance detection interruption control operation shown in FIG. 10 from the operation unit 150 (FIG. 11) provided in the image forming apparatus 100 or the charge-eliminating apparatus 200. In the embodiment, both the maintenance detection full control operation shown in FIG. 9 and the maintenance detection interruption control operation shown in FIG. 10 are used, but the embodiment is not limited to this. The image forming system 300 may be configured to perform only one of the control operations.

FIG. 9 is a flowchart of the maintenance detection full control operation when the door 201 of the charge-eliminating apparatus 200 is opened or closed. The controller 58 performs the maintenance detection full control operation in accordance with a program stored in the storage unit 59. When the door 201 of the charge-eliminating apparatus 200 is opened, the maintenance detection full control operation is started. The controller 58 determines whether or not the door 201 has been closed (S901). In a case in which the door 201 is open (NO in S901), the controller 58 returns the process to S901 and waits for the door 201 to be closed. In a case in which the door 201 has been closed (YES in S901), the controller 58 determines whether or not it is stored in the storage unit 59 that the maintenance is required for the ionizer 46 (S902). The determination is made based on, for example, the maintenance detection result that is a result of the previous determination stored in the storage unit 59 in S507 in FIG. 5 or S608 in FIG. 6. In a case in which it is stored in the storage unit 59 that the maintenance is not required (NO in S902), the controller 58 ends the maintenance detection full control operation.

In a case in which it is stored in the storage unit 59 that the maintenance is required (YES in S902), the controller 58 alternately switches the H-level and the L-level of the LED control signal 105 to blink the LED 56 (S903). Next, the controller 58 switches the ionizer ON/OFF signal 101 from the L-level to the H-level to put the ionizer 46 into the ON state (S904). The controller 58 switches the maintenance detection mode shift signal 102 from the L-level to the H-level to start the maintenance detection (S905), and advances the process to S906.

The controller 58 determines whether or not the maintenance detection signal 103 of the H-level has been received and whether or not a predetermined time has elapsed since the maintenance detection was started (S906). In a case in which the maintenance detection signal 103 of the H-level has not been received and the predetermined time has not elapsed (NO in S906), the controller 58 returns the process to S906 and continues the maintenance detection until the maintenance detection signal 103 of the H-level has been received or the predetermined time has elapsed. In a case in which the maintenance detection signal 103 of the H-level has been received or the predetermined time has elapsed without the maintenance detection signal 103 of the H-level having been received (YES in S906), the controller 58 stores the maintenance detection result in the storage unit 59 (S907). In a case in which the maintenance detection signal 103 of the H-level has been received, the controller 58 stores in the storage unit 59 as the maintenance detection result that the maintenance is required for the ionizer 46. In a case in which the predetermined time has elapsed while the maintenance detection signal 103 is at the L-level, the controller 58 stores in the storage unit 59 as the maintenance detection result that the maintenance is not required for the ionizer 46.

The controller 58 determines whether or not it is stored in the storage unit 59 that the maintenance is required for the ionizer 46 (S908). In a case in which it is stored in the storage unit 59 that the maintenance is required (YES in S908), the controller 58 advances the process to S910. On the other hand, in a case in which it is stored in the storage unit 59 that the maintenance is not required (NO in S908), it indicates that the maintenance (cleaning) of the ionizer 46 was performed. Therefore, the controller 58 switches the LED control signal 105 to the L-level to turn the LED 56 off (S909), and advances the process to S910.

The controller 58 determines whether or not a print job has been input to the image forming apparatus 100 (S910). In a case in which the print job has been input (YES in S910), the image forming apparatus 100 starts the print job (S911) and the controller 58 ends the maintenance detection full control operation. In a case in which the print job has not been input (NO in S910), the controller 58 shifts the state of the charge-eliminating apparatus 200 to a standby state (S912) and ends the maintenance detection full control operation.

FIG. 10 is a flowchart of the maintenance detection interruption control operation when the door 201 of the charge-eliminating apparatus 200 is opened or closed. The controller 58 performs the maintenance detection interruption control operation in accordance with a program stored in the storage unit 59. When the door 201 of the charge-eliminating apparatus 200 is opened, the maintenance detection interruption control operation is started. The controller 58 determines whether or not the door 201 has been closed (S1001). In a case in which the door 201 is open (NO in S1001), the controller 58 returns the process to S1001 and waits for the door 201 to be closed. In a case in which the door 201 has been closed (YES in S1001), the controller 58 determines whether or not it is stored in the storage unit 59 that the maintenance is required for the ionizer 46 (S1002). The determination is made based on, for example, the maintenance detection result which is the previous determination result stored in the storage unit 59 in S507 of FIG. 5 or S608 of FIG. 6. In a case in which it is stored in the storage unit 59 that the maintenance is not required (NO in S1002), the controller 58 ends the maintenance detection interruption control operation.

In a case in which it is stored in the storage unit 59 that the maintenance is required (YES in S1002), the controller 58 alternately switches the H-level and the L-level of the LED control signal 105 to blink the LED 56 (S1003). Next, the controller 58 switches the ionizer ON/OFF signal 101 from the L-level to the H-level to put the ionizer 46 into the ON state (S1004). The controller 58 switches the maintenance detection mode shift signal 102 from the L-level to the H-level to start the maintenance detection (S1005), and advances the process to S1006.

The controller 58 determines whether or not the maintenance detection signal 103 of the H-level has been received and whether or not a predetermined time has elapsed since the maintenance detection was started (S1006). In a case in which the maintenance detection signal 103 of the H-level has been received or the predetermined time has elapsed without receiving the maintenance detection signal 103 of the H-level (YES in S1006), the controller 58 stores the maintenance detection result in the storage unit 59 (S1007).

The controller 58 determines, based on the maintenance detection result, whether or not it is stored in the storage unit 59 that the maintenance is required for the ionizer 46 (S1008). In a case in which it is stored in the storage unit 59 that the maintenance is required (YES in S1008), the controller 58 advances the process to S1010. In a case in which it is stored in the storage unit 59 that the maintenance is not required (NO in S1008), it indicates that the maintenance (cleaning) of the ionizer 46 was performed. Therefore, the controller 58 switches the LED control signal 105 to the L-level to turn the LED 56 off (S1009), and advances the process to S1010.

The controller 58 determines whether a print job has been input to the image forming apparatus 100 (S1010). In a case in which the print job has been input (YES in S1010), the image forming apparatus 100 starts the print job (S1011) and the controller 58 ends the maintenance detection interruption control operation. In a case in which the print job has not been input (NO in S1010), the controller 58 shifts the state of the charge-eliminating apparatus 200 to the standby state (S1012) and ends the maintenance detection interruption control operation.

In S1006, in a case in which the maintenance detection signal 103 of the H-level has not been received and the predetermined time has not elapsed (that is, during maintenance detection) (NO in S1006), the controller 58 advances the process to S1013. The controller 58 determines whether or not a print job has been input to the image forming apparatus 100 (S1013). In a case in which the print job has not been input (NO in S1013), the controller 58 returns the process to S1006 and continues the maintenance detection. In a case in which the print job has been input (YES in S1013), the controller 58 interrupts the maintenance detection (S1014). The image forming apparatus 100 starts the print job (S1015) and the controller 58 ends the maintenance detection interruption control operation.

As described above, after the print job of the image forming apparatus 100 is completed, the controller 58 performs the maintenance required determination control to determine whether or not the maintenance is required for the ionizer 46. Also, the controller 58 performs the maintenance required determination control when the power is turned on to the charge-eliminating apparatus 200 or when the door 201 of the charge-eliminating apparatus 200 is opened and closed. Also, in the case in which the print job is input in the middle of the maintenance required determination control, the controller 58 interrupts the maintenance required determination control and starts the print job. Thus, the controller 58 performs the maintenance required determination control at an appropriate timing, thereby preventing a decrease in productivity due to the time required for the maintenance required determination control and improving usability.

According to the disclosure, it is possible to provide the charge-eliminating apparatus in which a user can easily check whether or not the maintenance is required for the non-contact charge eliminating unit.

Embodiment(s) of the present disclosure can also be realized by a computer of a system or apparatus that reads out and performs computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-011637, filed Jan. 30, 2023, which is hereby incorporated by reference herein in its entirety.

What is claimed is:

1. A charge-eliminating apparatus configured to be connectable downstream of an image forming apparatus with respect to a conveyance direction of a sheet, and configured to eliminate charge of the sheet on which an image is formed by the image forming apparatus, the charge-eliminating apparatus comprising:

- a conveying member including a roller and configured to convey the sheet conveyed from the image forming apparatus;
- a non-contact charge eliminating unit including electrode portions and configured to eliminate charge of the sheet in a non-contact state with respect to the sheet conveyed by the conveying member;
- a frame configured to accommodate the conveying member and the non-contact charge eliminating unit;
- an indicator configured to indicate indication contents indicating that maintenance is required for the non-contact charge eliminating unit based on a predetermined signal output from the non-contact charge eliminating unit, the indicator being mounted on an upper surface or a front surface of an exterior surface of the frame; and
- a controller configured to perform a maintenance required determination control to determine whether the maintenance is required or not for the non-contact charge eliminating unit after a charge eliminating operation in which the non-contact charge eliminating unit eliminates the charge from a plurality of sheets that are conveyed in succession is completed,
- wherein the controller stores a maintenance detection result of the maintenance required determination control in a storage unit, and
- wherein in a case where the maintenance detection result, stored in the storage unit when power is turned on to the charge-eliminating apparatus or when a door of the charge-eliminating apparatus is opened or closed, indicates that the maintenance is required for the non-contact charge eliminating unit, the controller performs the maintenance required determination control again.

2. The charge-eliminating apparatus according to claim 1, wherein the indicator indicates the indication contents:

- in a first indication pattern in a case where the maintenance is required for the non-contact charge eliminating unit, and
- in a second indication pattern in a case where an abnormality occurs in the non-contact charge eliminating unit.

3. The charge-eliminating apparatus according to claim 2, wherein:

- the non-contact charge eliminating unit comprises a first charge-eliminating member, including one electrode portion among the electrode portions, disposed opposite to a first surface of the sheet conveyed by the conveying member, and a second charge-eliminating member, including another electrode portion among the electrode portions, disposed opposite to a second surface opposite to the first surface of the sheet, and
- the indicator indicates the indication contents:
  - in the first indication pattern in a case where maintenance of at least one of the first charge-eliminating member or the second charge-eliminating member is required; and
  - in the second indication pattern in a case where abnormality occurs in at least one of the first charge-eliminating member or the second charge-eliminating member.

4. The charge-eliminating apparatus according to claim 2, wherein:

- the indicator is a light emitting diode,
- one of the first indication pattern or the second indication pattern is a pattern in which the light emitting diode is turned on, and
- the other of the first indication pattern or the second indication pattern is a pattern in which the light emitting diode blinks.

5. The charge-eliminating apparatus according to claim 1, wherein the predetermined signal includes:

- a maintenance detection signal indicating whether the maintenance is required or not for the non-contact charge eliminating unit; or
- an abnormal detection signal indicating an abnormality occurring in the non-contact charge eliminating unit; or
- both the maintenance detection signal and the abnormal detection signal.

6. The charge-eliminating apparatus according to claim 1, wherein the non-contact charge eliminating unit is an ionizer configured to generate ions.

7. The charge-eliminating apparatus according to claim 1, further comprising a contact charge eliminating unit provided upstream of the non-contact charge eliminating unit in the conveyance direction of the sheet and configured to eliminate charge of the sheet in a contact state with respect to the sheet.

8. The charge-eliminating apparatus according to claim 1, wherein:

- in a case where the controller receives the predetermined signal until a time when a predetermined time elapses from a time when the maintenance required determination control is started, the controller determines that the maintenance is required for the non-contact charge eliminating unit, and
- in a case where the controller does not receive the predetermined signal until the time when the predetermined time elapses, the controller determines that the maintenance is not required for the non-contact charge eliminating unit.

9. The charge-eliminating apparatus according to claim 1, wherein the controller is configured to perform the maintenance required determination control to determine whether the maintenance is required or not for the non-contact charge eliminating unit based on power being turned on to the charge-eliminating apparatus.

10. The charge-eliminating apparatus according to claim 1, wherein the controller is configured to perform the maintenance required determination control to determine whether the maintenance is required or not for the non-contact charge eliminating unit based on a door of the charge-eliminating apparatus being closed.

11. The charge-eliminating apparatus according to claim 1, wherein:

- the conveying member includes a conveyance guide forming a conveyance path for the sheet, and the conveyance guide is disposed overlapping with the non-contact charge eliminating unit with respect to the conveyance direction of the sheet.

12. A charge-eliminating apparatus, configured to be connectable downstream of an image forming apparatus with respect to a conveyance direction of a sheet, and configured to eliminate charge of the sheet on which an image is formed by the image forming apparatus, the charge-eliminating apparatus comprising:

a conveying member including a roller and configured to convey the sheet conveyed from the image forming apparatus;

a non-contact charge eliminating unit including electrode portions and configured to eliminate charge of the sheet in a non-contact state with respect to the sheet conveyed by the conveying member;

a frame configured to accommodate the conveying member and the non-contact charge eliminating unit;

an indicator configured to indicate indication contents indicating that maintenance is required for the non-contact charge eliminating unit based on a predetermined signal output from the non-contact charge eliminating unit, the indicator being mounted on an upper surface or a front surface of an exterior surface of the frame; and a controller configured to perform a maintenance required determination control to determine whether the maintenance is required or not for the non-contact charge eliminating unit after a charge eliminating operation in which the non-contact charge eliminating unit eliminates the charge from a plurality of sheets that are conveyed in succession is completed, wherein in a case where a print job is input in a middle of the maintenance required determination control, the controller interrupts the maintenance required determination control and starts the print job.

13. An image forming system comprising:

an image forming apparatus configured to form an image on a sheet; and a charge-eliminating apparatus connected downstream of the image forming apparatus with respect to a conveying direction of the sheet and configured to eliminate charge of the sheet on which the image is formed by the image forming apparatus, the charge-eliminating apparatus including:

a conveying member including a roller and configured to convey the sheet conveyed from the image forming apparatus;

a non-contact charge eliminating unit including an electrode portion and configured to eliminate charge of the sheet in a non-contact state with respect to the sheet conveyed by the conveying member;

a frame configured to accommodate the conveying member and the non-contact charge eliminating unit;

an indicator configured to indicate indication contents indicating that maintenance is required for the non-contact charge eliminating unit based on a predetermined signal output from the non-contact charge eliminating unit, the indicator being mounted on an upper surface or a front surface of an exterior surface of the frame; and a controller configured to perform a maintenance required determination control to determine whether the maintenance is required or not for the non-contact charge eliminating unit after a charge eliminating operation in which the non-contact charge eliminating unit eliminates the charge from a plurality of sheets that are conveyed in succession is completed, wherein the controller stores a maintenance detection result of the maintenance required determination control in a storage unit, and wherein in a case where the maintenance detection result, stored in the storage unit when power is turned on to the charge-eliminating apparatus or when a door of the charge-eliminating apparatus is opened or closed, indicates that the maintenance is required for the non-contact charge eliminating unit, the controller performs the maintenance required determination control again.

* * * * *